US008626786B2

(12) United States Patent
Halcrow et al.

(10) Patent No.: US 8,626,786 B2
(45) Date of Patent: *Jan. 7, 2014

(54) DYNAMIC LANGUAGE CHECKING

(75) Inventors: Michael A. Halcrow, Pflugerville, TX (US); Dustin Kirkland, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,506

(22) Filed: Jan. 30, 2012

(65) Prior Publication Data

US 2012/0130977 A1 May 24, 2012

Related U.S. Application Data

(63) Continuation of application No. 11/165,448, filed on Jun. 23, 2005, now Pat. No. 8,131,746.

(51) Int. Cl.
*G06F 17/30* (2006.01)
(52) U.S. Cl.
USPC .......................................... 707/765; 707/769
(58) Field of Classification Search
USPC .................... 707/769, 765; 715/257
See application file for complete search history.

(56) References Cited

U.S. PATENT DOCUMENTS

| 5,678,053 | A | * | 10/1997 | Anderson .................... 704/1 |
| 5,892,919 | A | | 4/1999 | Nielson |
| 5,907,680 | A | | 5/1999 | Nielsen |
| 6,005,860 | A | * | 12/1999 | Anderson et al. ............ 370/352 |
| 6,012,075 | A | | 1/2000 | Fein et al. |
| 6,041,324 | A | | 3/2000 | Earl et al. |
| 6,088,707 | A | * | 7/2000 | Bates et al. .................... 715/235 |
| 6,092,100 | A | | 7/2000 | Berstis et al. |
| 6,349,295 | B1 | | 2/2002 | Tedesco et al. |
| 6,434,548 | B1 | | 8/2002 | Emens et al. |
| 6,804,682 | B1 | * | 10/2004 | Kemper et al. .................... 1/1 |
| 7,149,970 | B1 | * | 12/2006 | Pratley et al. ................. 715/257 |
| 8,131,746 | B2 | | 3/2012 | Halcrow et al. |
| 2002/0116411 | A1 | | 8/2002 | Peters et al. |
| 2004/0128309 | A1 | | 7/2004 | Gurney et al. |
| 2004/0205672 | A1 | | 10/2004 | Bates et al. |
| 2004/0249795 | A1 | | 12/2004 | Brockway et al. |
| 2005/0235031 | A1 | | 10/2005 | Schneider et al. |
| 2006/0023945 | A1 | * | 2/2006 | King et al. .................... 382/173 |
| 2006/0112066 | A1 | | 5/2006 | Hamzy |
| 2006/0294067 | A1 | | 12/2006 | Halcrow et al. |

FOREIGN PATENT DOCUMENTS

GB 2345771 7/2000

OTHER PUBLICATIONS

"U.S. Appl. No. 10/996,321 Final Office Action", Apr. 17, 2008, 14 pages.
"U.S. Appl. No. 10/996,321 Final Office Action", Jun. 19, 2007, 12 pages.

(Continued)

*Primary Examiner* — Shyue Jiunn Hwa
(74) *Attorney, Agent, or Firm* — DeLizio Gilliam, PLLC

(57) ABSTRACT

Dynamic language checking includes identifying questionable language usage; creating a query in dependence upon the questionable language usage; querying a search engine with the query; receiving from the search engine search result statistics describing the search results for the query; and determining, in dependence upon search results statistics returned by the search engine, whether the questionable language usage is proper language usage.

8 Claims, 5 Drawing Sheets

(56) References Cited

OTHER PUBLICATIONS

U.S. Appl. No. 10/996,321 Final Office Action, Apr. 17, 2008, 14 pages.
"U.S. Appl. No. 10/996,321 Office Action", Feb. 28, 2007, 11 pages.
"U.S. Appl. No. 10/996,321 Office Action", Oct. 30, 2007, 14 pages.
"U.S. Appl. No. 11/165,448 Final Office Action", Oct. 14, 2008, 18 pages.
"U.S. Appl. No. 11/165,448 Office Action", May 30, 2008, 12 pages.
"U.S. Appl. No. 11/165,448 Office Action", Sep. 13, 2007, 8 pages.
"U.S. Appl. No. 11/771,638 Final Office Action", Jun. 11, 2010, 13 pages.
"U.S. Appl. No. 11/771,638 Final Office Action", Oct. 24, 2011, 15 pages.
"U.S. Appl. No. 11/771,638 Office Action", Apr. 14, 2011, 14 pages.
"U.S. Appl. No. 11/771,638 Office Action", Jan. 8, 2010, 22 pages.

* cited by examiner

DYNAMIC LANGUAGE CHECKING

CROSS-REFERENCE TO RELATED APPLICATIONS

This patent applications is a continuation application that claims benefit under 35 U.S.C. §120 of U.S. patent application Ser. No. 11/165,448, which was filed on Jun. 23, 2005.

BACKGROUND

Embodiments of the inventive subject matter generally relate to data processing, or, more specifically, evaluating language usage in an application that supports language checking Many conventional applications support language usage checking of the content of documents created with the application. Such language checking includes spell checking and grammar checking Examples of applications that support language checking include word processing applications, spreadsheet applications, email applications, and many others as will occur to those of skill in the art. Despite the fact that the language usage being checked by these applications is evolving, the language checking functions are static. The quality of the language checking of an application is dependent upon the frequency with which the language checking function of the application functions is updated. If a properly-used-newly-coined word or phrase is not found in a spell checker's vocabulary or a grammar checker's phrase bank, the word or phrase is typically flagged as being misused. There is an ongoing need for improvement in language checking in applications which is not constrained by the dynamic evolution of language usage.

SUMMARY

Embodiments of the inventive subject matter include a computer program product for dynamic language checking. The computer program product comprises a computer readable storage medium having computer usable program code embodied therewith. The computer usable program code comprises a computer usable program code configured to identify a questionable language usage. The computer usable program code is configured to create a query in dependence upon the questionable language usage including identifying suggested language usage in dependence upon the questionable language usage and substituting at least one word of the questionable language usage with at least one word of the suggested language usage. The computer usable program code is configured to query a search engine with the query. The computer usable program code is configured to receive from the search engine search result statistics describing search results for the query. The computer usable program code is configured to determine, in dependence upon search results statistics returned by the search engine, whether the questionable language usage is proper language usage.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.
Introduction The present invention is described to a large extent in this specification in terms of methods for language checking Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Dynamic Language Checking

Figure 1:
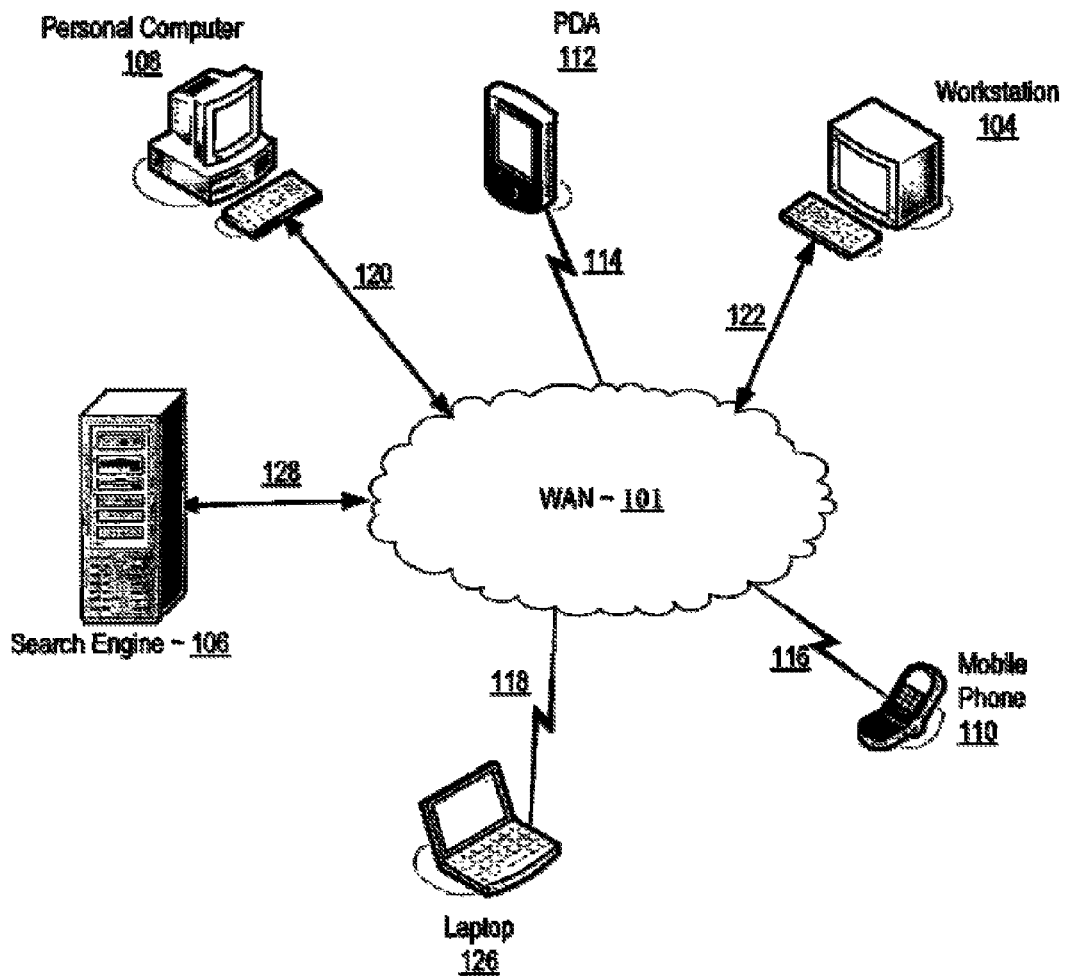
FIG. 1 sets forth a network diagram illustrating an exemplary system of computers each of which may have installed upon it an application modified to support dynamic language checking according to embodiments of the present invention.

Exemplary methods, systems, and products for language checking are described with reference to the accompanying drawings, beginning with FIG. 1. FIG. 1 sets forth a network diagram illustrating an exemplary system of computers each of which may have installed upon it an application modified to support dynamic language checking according to embodiments of the present invention. Examples of applications that currently support language checking and may be modified to support dynamic language checking include word processing applications, spreadsheet applications, email applications, and many others as will occur to those of skill in the art.

The data processing system of FIG. 1 includes wide area network ("WAN"). The network connection aspect of the architecture of FIG. 1 is only for explanation, not for limitation. In fact, systems for language checking may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, several exemplary devices including a PDA (112), a computer workstation (104), a mobile phone (110), a laptop (126), a server supporting a search engine (106) and personal computer (108) are connected to the WAN (101). Network-enabled mobile phone (110) connects to the WAN (101) through a wireless link (116), the laptop (126) connects to the WAN (101) through a wireless link (118), and the PDA (112) connects to the network (101) through a wireless link (114). In the example of FIG. 1, the personal computer (108) connects to the WAN (101) through a wireline connection (120), the computer workstation (104) connects to the WAN (101) through a wireline connection (122), and the server supporting a search engine (106) connects to the WAN (101) through a wireline (128) connection.

In the system of FIG. 1, the exemplary devices (108, 112, 104, 110, and 126) have installed upon them an application modified to support dynamic language checking according to embodiments of the present invention. Conventional applications supporting language checking may be modified through for example a plug-in designed to extend the language checking capabilities of the application according to embodiments of the present invention. Applications so modified are capable of identifying questionable language usage; creating a query in dependence upon the questionable language usage; querying a search engine (106) with the query; receiving from the search engine (106) search result statistics describing the search results for the query; and determining, in dependence upon search results statistics returned by the search engine (106), whether the questionable language usage is proper usage.

Search result statistics are data that describe the results returned from a particular search query. The search result statistics are not the search results themselves but statistics describing the search results. A common example of search result statistics is a raw number of pages returned by the search engine for a particular query. Often such search results statistics are provided in a predetermined location in the results page returned by a search engine.

In one straightforward example of dynamic language checking, the questionable language is used as a query without modification. In such an example, if search result statistics returned from the search engine demonstrate that the questionable language is found in at least a predetermined number of web pages, and therefore sufficiently used, then the questionable language is determined to be proper language usage. If search result statistics returned from the search engine, demonstrate that the questionable language is not found in at least a predetermined number of web pages, and therefore not sufficiently used, then the questionable language is determined to be improper language usage. Such a straightforward example of dynamic language checking confirms or denies the use of questionable language by relying on language usage in web pages to demonstrate proper usage. Dynamic language checking takes advantage of the fact that newly coined words and phrases often appear in web pages already indexed by search engines well before being incorporated in the vocabularies of conventional spell checkers or the phrase banks of conventional grammar checkers.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

Language checking in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary computer (152) useful in language checking according to embodiments of the present invention. The computer (152) of FIG. 2 includes at least one computer processor (156) or 'CPU' as well as random access memory (168) ("RAM") which is connected through a system bus (160) to processor (156) and to other components of the computer.

Stored in RAM (168) is an application that supports language checking Examples of applications that support language checking include word processing applications, spreadsheet applications, email applications and many others as will occur to those of skill in the art. The exemplary application (232) includes a language checker (240) that in turn includes a grammar checker (208) and a spell checker (210). The grammar checker (208) identifies questionable language usage by comparing the language usage in a document with a phrase bank (242). If the phrase is not found in the phrase bank, the grammar checker flags the language usage as questionable. Often grammar checkers (208) also employ language models to more accurately evaluate grammar. The exemplary spell checker (210) of FIG. 1 identifies questionable language usage in a document by comparing the words of the usage to a vocabulary (244). The spell checker (210) then flags as questionable any word not contained in the vocabulary (244).

Figure 2:
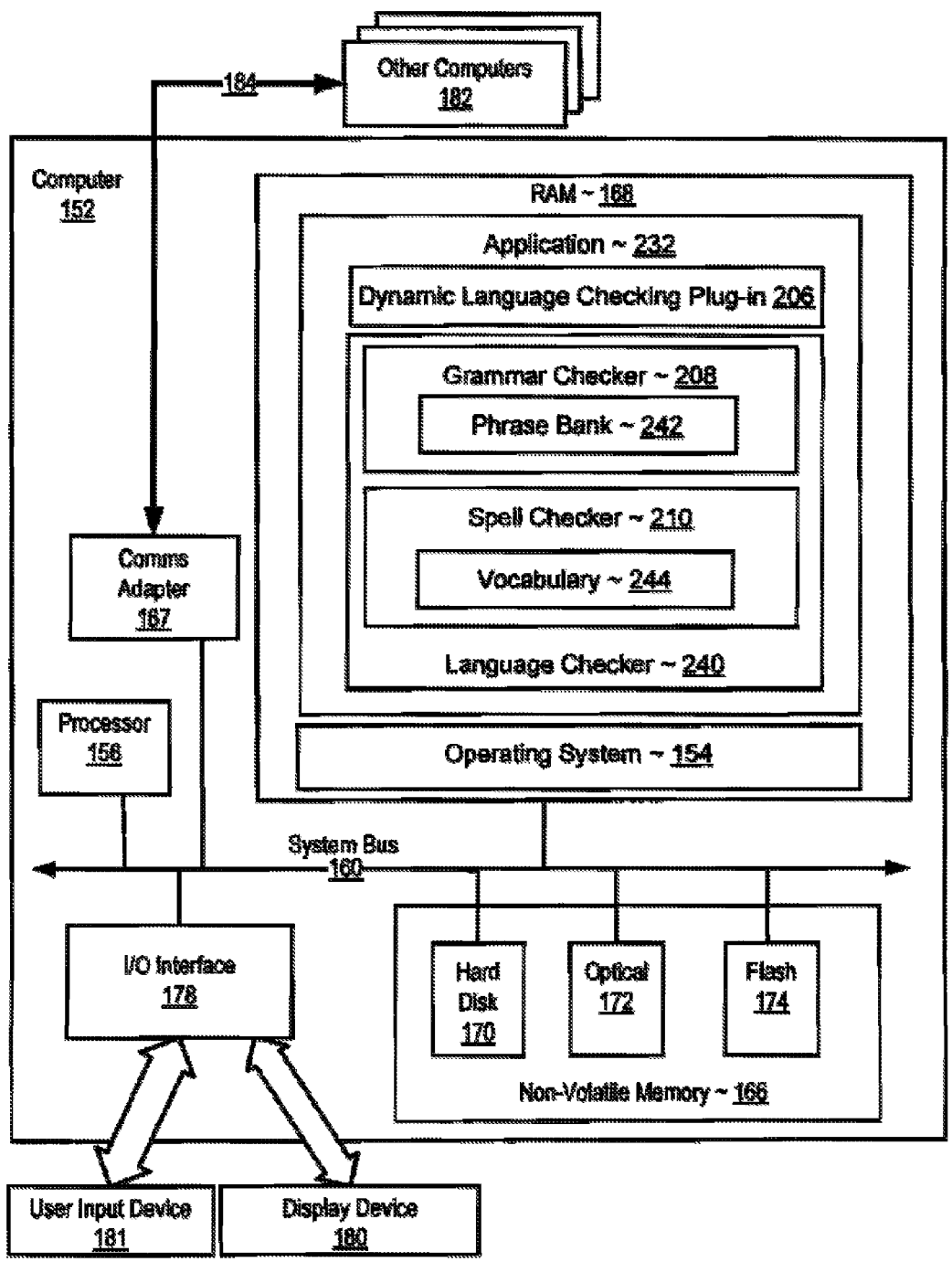
FIG. 2 sets forth a block diagram of automated computing machinery comprising an exemplary computer useful in language checking according to embodiments of the present invention.

The exemplary application (232) of FIG. 2 has been modified by the installation of a dynamic language checking plug-in (206). The dynamic language checking plug-in operates generally by identifying questionable language usage; creating a query in dependence upon the questionable language usage; querying a search engine with the query; receiving from the search engine search result statistics describing the search results for the query; and determining, in dependence upon search results statistics returned by the search engine, whether the questionable language usage is proper usage.

Also stored in RAM (168) is an operating system (154). Operating systems useful in computers according to embodiments of the present invention include UNIX™, Linux™, Microsoft Windows NT™, AIX™, IBM's i5/OS™, and others as will occur to those of skill in the art. Operating system (54), application (232), and dynamic language checking plug-in (206) in the example of FIG. 2 are shown in RAM (168), but many components of such software typically are stored in non-volatile memory (166) also.

Computer (152) of FIG. 2 includes non-volatile computer memory (166) coupled through a system bus (160) to processor (156) and to other components of the computer (152).

Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out through serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for language checking according to embodiments of the present invention include modems for wired dial-up communications, Ethernet (IEEE 802.3) adapters for wired network communications, and 802.11b adapters for wireless network communications.

Figure 3:
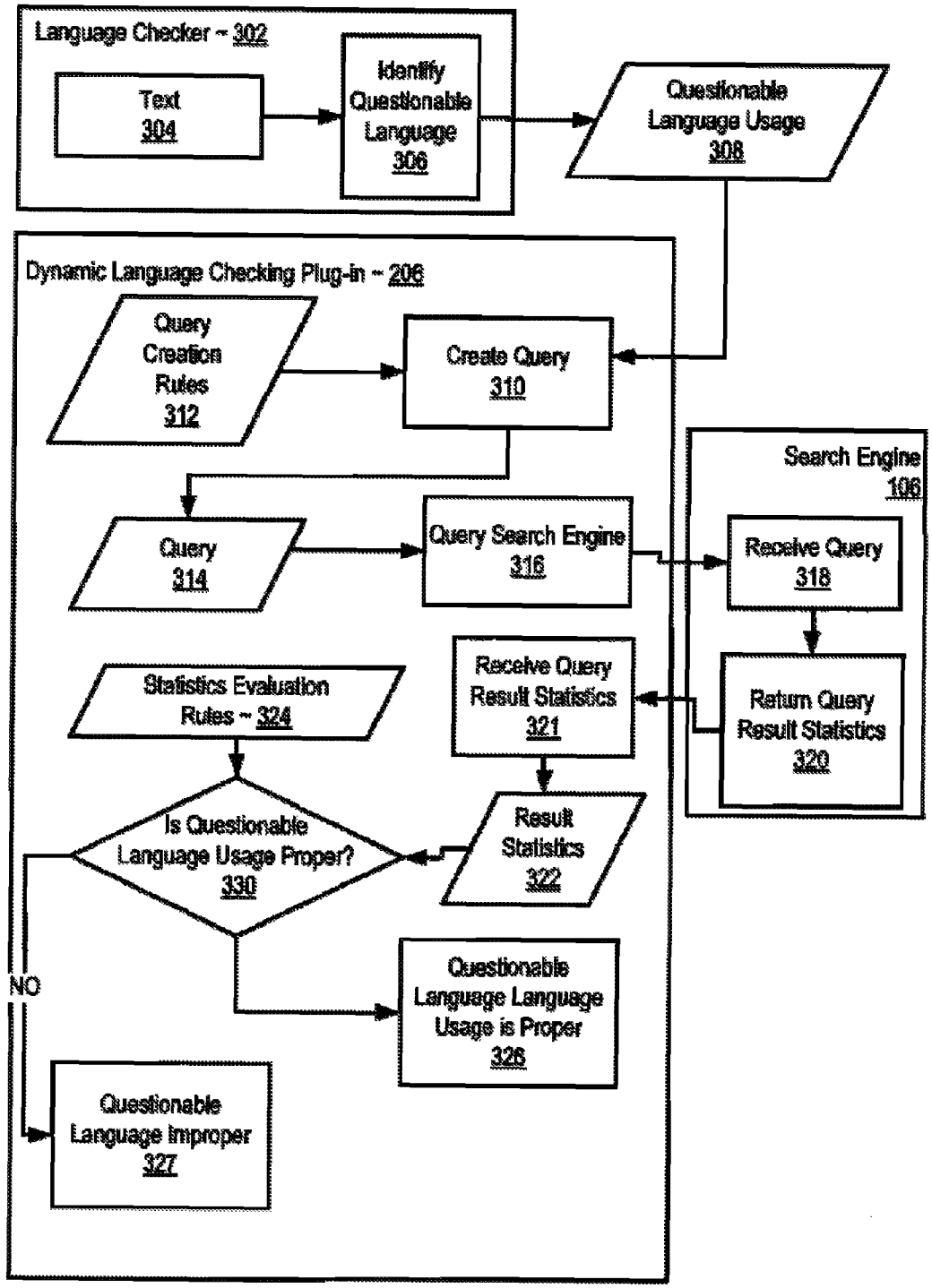
FIG. 3 sets forth a flow chart illustrating an exemplary computer implemented method for dynamic language checking.

For further explanation, FIG. 3 sets forth a flow chart illustrating an exemplary computer implemented method for dynamic language checking As discussed above, many applications currently support language checking, such as word processing applications, spreadsheet applications, email applications and so on as will occur to those of skill in the art. All such applications are capable of modification, through for example a plug-in, to include the capability of dynamic language checking according to embodiments of the present invention.

The method of FIG. 3 includes identifying (306) questionable language usage (308). In the method of FIG. 3 identifying (306) questionable language usage (308) is carried out by a language checker such as a spelling checker or a grammar checker. As discussed above, grammar checkers typically identify questionable language usage by comparing the text (304) of the language usage with a phrase bank. If the phrase is not found in the phrase bank, the grammar checker identifies the language usage as questionable. Often grammar checkers also employ language models to more accurately evaluate phrases. Spell checkers often identify questionable language usage by comparing the text of the language to a vocabulary. If a word is not found in the vocabulary, then the spell checker identifies the word as questionable language usage (308).

The method of FIG. 3 also includes creating (310) a search engine query (314) in dependence upon the questionable language usage (308) and querying (316) a search engine (106) with the query (314). One straightforward way of creating a query in dependence upon the questionable language usage is carried out by using the identified questionable language usage as a query without further modification.

Querying a search engine may be carried out through the use of URL encoded data passed to a search engine through, for example, an HTTP GET or HTTP POST function. URL encoded data is data packaged in a URL for data communications, in this case, passing a query to a search engine. In the case of HTTP communications, the HTTP GET and POST functions are often used to transmit URL encoded data. In this context, it is useful to remember that URLs do more than merely request file transfers. URLs identify resources on servers. Such resources may be files having filenames, but the resources identified by URLs also include, for example, queries to databases. Results of such queries do not necessarily reside in files, but they are nevertheless data resources identified by URLs and identified by a search engine and query data that produce such resources. An example of URL encoded data is:

http://www.example.com/
search?field1=value1&field2=value2

This example of URL encoded data representing a query that is submitted over the web to a search engine. More specifically, the example above is a URL bearing encoded data representing a query to a search engine and the query is the string "field1=value1&field2=value2." The exemplary encoding method is to string field names and field values separated by '&' and "=" and designate the encoding as a query by including "search" in the URL. The exemplary URL encoded search query is for explanation and not for limitation. In fact, different search engines may use different syntax in representing a query in a data encoded URL and therefore the particular syntax of the data encoding may vary according to the particular search engine queried.

The method of FIG. 3 also includes returning (320), by the search engine (106) search result statistics. Search result statistics are data that describe the results returned from a particular search query. The search result statistics are not the search results themselves but statistics describing the search results. A common example of search result statistics is a raw number of pages returned by the search engine for the query. Often such search results statistics are provided in a predetermined location in the results page returned by a search engine.

The method of FIG. 3 also includes receiving (321) from the search engine (106) search result statistics (322) describing the search results for the query (314) and determining (326), in dependence upon search results statistics (322) returned by the search engine (106), whether the questionable language usage is proper usage. In the example of FIG. 3, determining (326) whether the questionable language usage is proper is carried out in dependence upon statistics evaluation rules. Statistics evaluation rules (324) are rules designed to identify proper language usage in dependence upon search result statistics for one or more queries created in dependence upon questionable language. One simple statistics evaluation rule is a predetermined threshold of web pages that must contain the questionable language usage to confirm that the questionable usage is in fact proper usage. Consider the following statistics evaluation rule. TABLE-US-00001 IF query=questionable language; AND results statistics include over 1,000,000 web pages; THEN proper language usage=questionable language.

In the example above, if a query including the questionable language submitted in unmodified form to a search engine returns over 1,000,000 web pages then the questionable language is determined to be properly used. The fact that the questionable language usage has been found in over 1,000,000 web pages provides enough basis to conclude that the questionable language has been used properly.

Consider the following exemplary use case. An application supporting dynamic language checking according to embodiments of the present invention identifies the phrase "in that vein" as questionable language and queries a search engine with the phrase. The search result statistics returned by the search engine demonstrate that the phrase is found in 49,100 web pages. A statistics evaluation rule dictates that phrases found in over 25,000 web pages are determined to be properly used. An application supporting dynamic language checking therefore determines that the questionable phrase "in that vein" is properly used. Similarly, when the same application identifies the phrase "in that vain" as questionable language and queries a search engine with the phrase. The search result statistics returned by the search engine demonstrate that the phrase is found in only 1,520 web pages. Using the same statistics evaluation rule, an application supporting dynamic language checking determines that the questionable phrase "in that vain" is improperly used.

The example of FIG. 3 confirms whether the questionable language is properly used or determines that the questionable language is not properly used (327). Dynamic language checking according to embodiments of the present invention may also use search result statistics to perform more analysis on questionable language usage to determine proper language usage in dependence upon the identified questionable language usage. For further explanation, FIG. 4 sets forth a flow chart illustrating an exemplary method of dynamic language checking that includes identifying (306) questionable language usage (308). As discussed above, grammar checkers typically identify questionable language usage by comparing the text (304) of the language usage with a phrase bank. If the phrase is not found in the phrase bank, the grammar checker identifies the language usage as questionable. Often grammar checkers also employ language models to more accurately evaluate grammar. Spell checkers often identify questionable language usage by comparing the text of the language to a vocabulary. If a word is not found in the vocabulary, then the spell checker identifies the word as questionable language usage (308).

Figure 4:
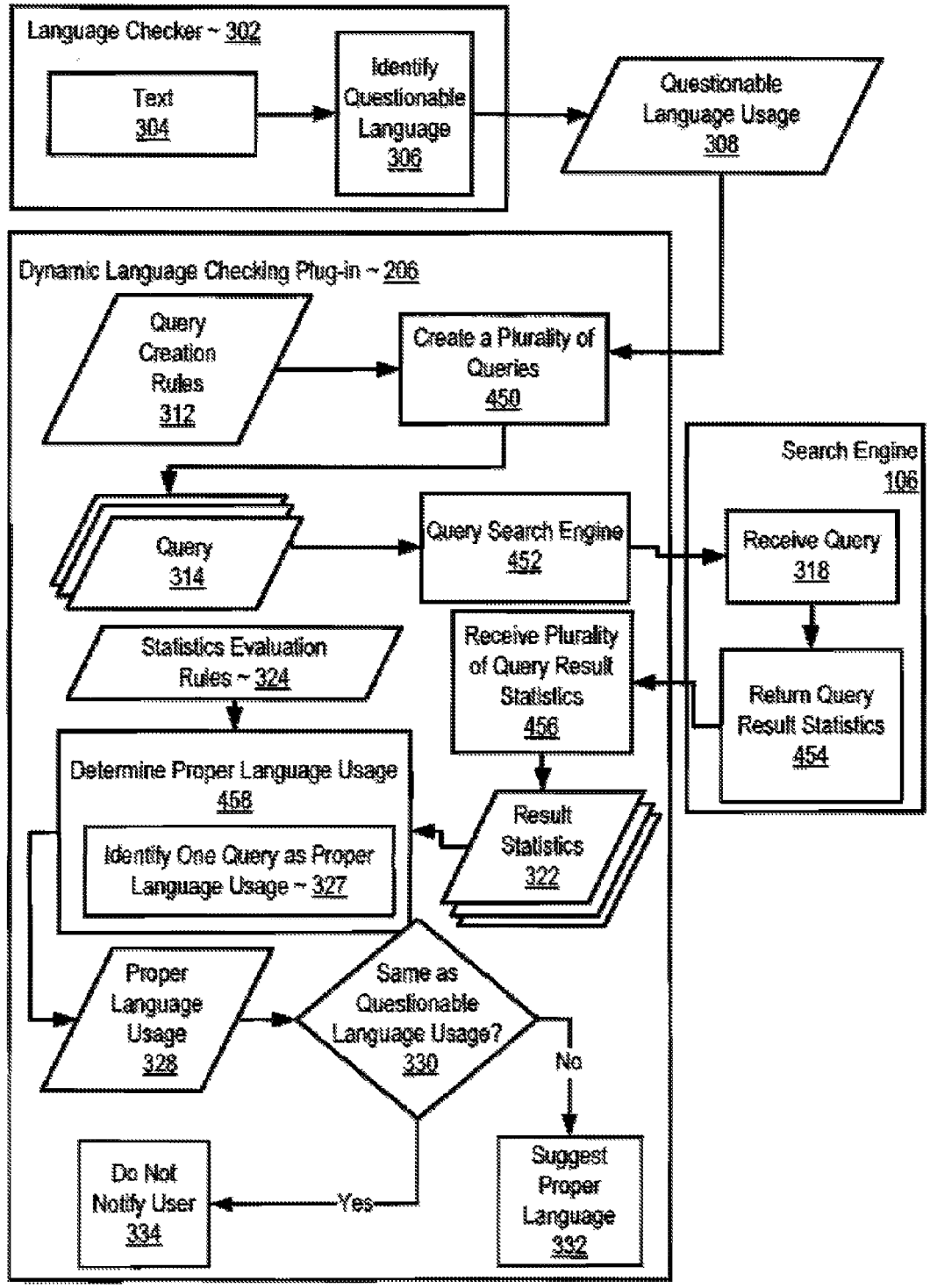
FIG. 4 sets forth a flow chart illustrating another exemplary method of dynamic language checking FIG. 5 sets forth a flow chart illustrating an exemplary method for creating one of a plurality queries in dependence upon the questionable language usage.
Figure 5:
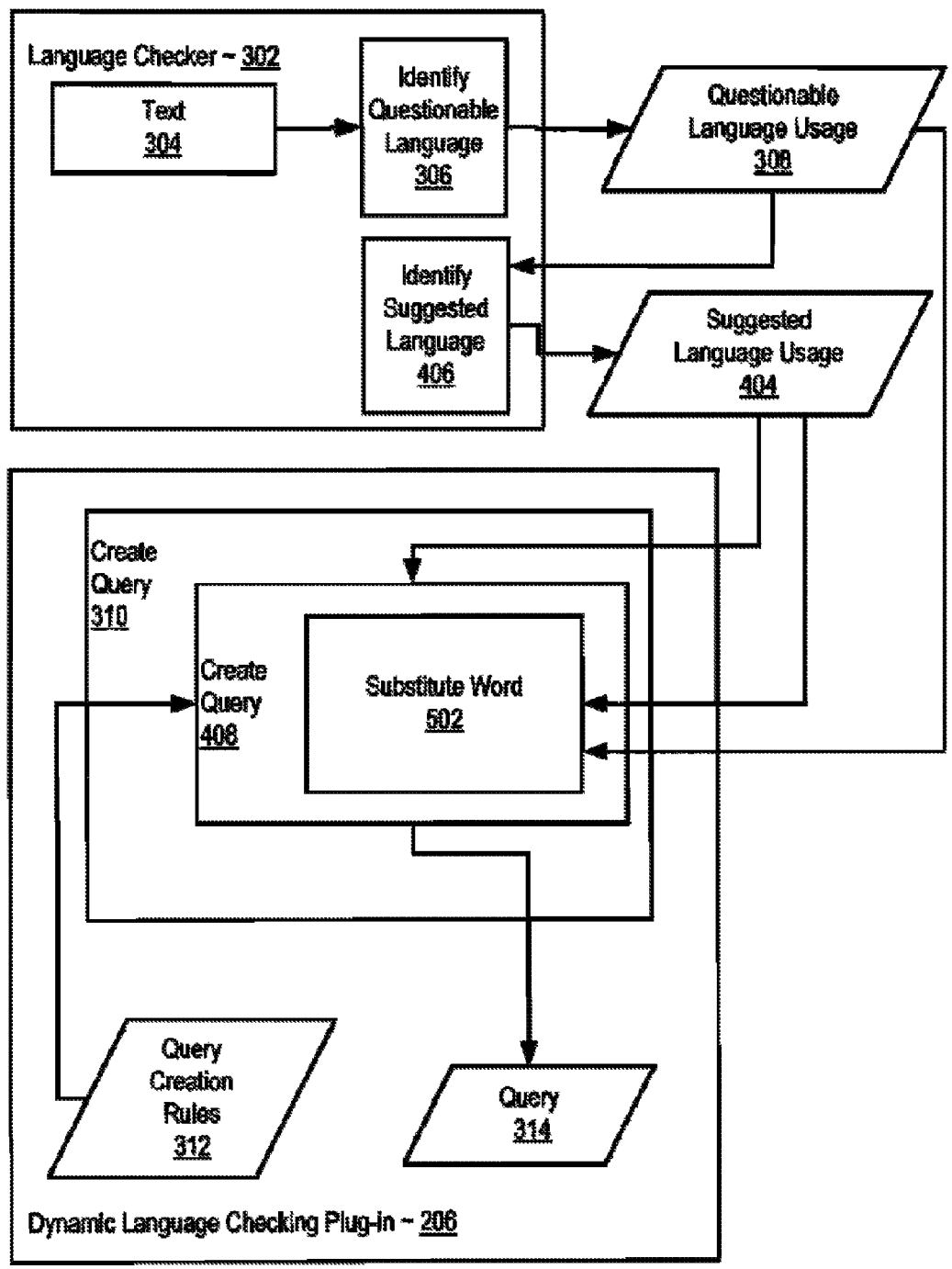

The method of FIG. 4 also includes creating (450) a plurality of a queries (314) in dependence upon the questionable language usage (308). For further explanation, FIG. 5 sets forth a flow chart illustrating an exemplary method for creating (310) one of a plurality queries (314) in dependence upon the questionable language usage (308). The example of FIG. 5 includes identifying (306) questionable language and identifying (406) suggested language usage (404) in dependence upon the questionable language usage (306). Conventional language checkers also often provide suggested language usage in response to identifying questionable language usage. In the example of FIG. 5, identifying (406) suggested language usage (404) is carried out by a language checker (302) and provided to a dynamic language checking plug-in (206) operating according to embodiments of the present invention.

The method of FIG. 5 includes creating (408) a query (314) in dependence upon the suggested language usage (404) according to query creation rules (312). Query creation rules (312) are rules governing a query creation in dependence upon a suggested language usage. One way of creating (408) a query (314) in dependence upon the suggested language usage (404) in dependence upon query creation rules (312) includes substituting (502) at least one word of the questionable language usage (308) with at least one word of the suggested language usage (404). Consider the following example. An application supporting dynamic language checking identifies the word "Linux" as questionable in the sentence "I like the Linux operating system." Suggested language identified by a language checker for the word "Linux" include "Line," "Linea," "Lined," "Linen." Substituting at least one word of the questionable language usage (308) with at least one word of the suggested language usage (404) yields the following possible queries: "I like the Line operating system," "I like the Linea operating system," "I like the Lined operating system," and "I like the Linen operating system."

Creating (408) a query (314) in dependence upon the suggested language usage (404) by substituting (502) at least one word of the questionable language usage (308) with at least one word of the suggested language usage (404) according to query creation rules may also include rules determining which words before or after questionable language to use in the query. Continuing with the same example, a dynamic language checking plug-in creates for the suggested word "line" three queries from the questionable language usage "I like the Linux operating system." In a first query Linux is substituted with Line and two words after Linux are maintained in the query yielding "Line operating system." In a second query Linux is substituted with Line and two words before Linux are maintained in the query yielding "like the Line." In a third query Linux is substituted with Line and one word before Linux and one word after Linux are maintained in the query yielding "Line operating system."

The example queries discussed above are for explanation and not for limitation. Query creation rules (312) provide a vehicle to create queries in dependence upon suggested language usage in many ways and all such ways are well within the scope of the present invention.

Again with reference to FIG. 4: After identifying (306) questionable language usage (308) and creating (450) a plurality of a queries (314) in dependence upon the questionable language usage (308). The method of FIG. 4 includes querying (452) a search engine (106) with the queries (314) and receiving (456) from the search engine search result statistics (322) returned by the search engine describing the search results for each of the queries (314).

The method of FIG. 4 also includes determining (458), in dependence upon search results statistics (322) returned by the search engine (106), proper language usage (328). One way of determining (458), in dependence upon search results statistics (322) returned by the search engine (106), proper language usage (328) is carried out by identifying (327) one query as the proper language usage. Typically, the query found in the most web pages is identified as proper language usage.

For further explanation consider the following use case. An application supporting dynamic language checking identifies the word "Linux" as questionable in the sentence "I like the Linux operating system." Suggested language identified by a language checker for the word "Linux" include "Line," "Linea," "Lined," "Linen." Three queries are created for each suggested word by substituted Linux with the suggested word and maintaining two other words in each the query; two before Linux, two after Linux, and one before Linux and one after Linux. Three additional queries are also created without substituting Linux, yet maintaining two other words in each the query; two before Linux, two after Linux, and one before Linux and one after Linux. All the queries are then submitted to a search engine and the search result statistics for each query are used to determine the proper language usage. The search result statistics returned for each query are: TABLE-US-00002 "Line operating system" (941 web pages) "the Line operating" (1,010 web pages) "like the Line" (16,700 web pages) "Linea operating system" (2 web pages) "the Linea operating" (1 web pages) "like the Linea" (7 web pages) "Lined operating system" (2 web pages) "the Lined operating" (2 web pages) "like the Lined" (206 web pages) "Linen operating system" (1 web pages) "the Linen operating" (0 web pages) "like the Linen" (451 web pages) "Linux operating system" (635,000 web pages) "the Linux operating" (287,000 web pages) "like the Linux" (11,800 web pages)

In this example proper language usage is identified by selecting the word whose usage among a plurality of queries is the greatest. The results of the three are added giving a total number of web pages containing the word in the queries yielding. [0048] Linux (933,800) [0049] Line (18,651) [0050] Linea (10) [0051] Lined (210) [0052] Linen (452)

In this example, the search result statistic indicate that the word "Linux" in context was found in the most web pages and is therefore determined to be proper language usage. In this example, the questionable language usage is determined to be proper usage.

Because questionable language usage may be properly used, the method of FIG. 4 includes determining (330) whether the proper language usage (328) is the same as the questionable language usage (306). If the proper language usage (328) is the same as the questionable language usage (306), then the method of FIG. 4 does not notify the user of the questionable language. When the questionable language is in fact proper, the method of FIG. 4 operates transparently to a user. If the proper language usage (328) is the same as the questionable language usage (306), the method of FIG. 4 includes suggesting (332) the proper language usage (328) to a user if the proper language usage is not the same as the questionable language usage.

After determining proper language usage according to the method of FIG. 4, an application supporting dynamic language checking may save the proper language usage in a vocabulary or phrase bank available to a language checker. Saving the proper language usage prevents repeated checking of the same phrases.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for language checking as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product for dynamic language checking, the computer program product comprising:
   a computer readable storage medium having computer usable program code embodied therewith, the computer usable program code comprising a computer usable program code configured to:
   identify a questionable language usage;
   create a query in dependence upon the questionable language usage including identifying suggested language usage in dependence upon the questionable language usage and substituting at least one word of the questionable language usage with at least one word of the suggested language usage;
   query a search engine with the query;
   receive from the search engine search result statistics describing search results for the query; and
   determine, in dependence upon search results statistics returned by the search engine, whether the questionable language usage is proper language usage.

2. The computer program product of claim 1, wherein the computer usable program code configured to create a query in dependence upon the questionable language usage comprises the computer usable program code configured to use the identified questionable language usage as a query.

3. The computer program product of claim 1, wherein the computer usable program code configured to determine, in dependence upon search result statistics returned by the search engine, whether the questionable language usage is proper language usage comprises the computer usable program code configured to:
   receive a plurality of search result statistics for a plurality of queries created in dependence upon the questionable language usage; and
   identify one of the plurality of queries as the proper language usage in dependence upon the search result statistics and statistics evaluation rules.

4. The computer program product of claim 3, wherein the computer usable program code is further configured to:
   determine whether the proper language usage is the same as the questionable language usage; and
   suggest the proper language usage to a user when the proper language usage is not the same as the questionable language usage.

5. An apparatus comprising:
   a system bus;
   a processor coupled with the system bus;
   a communications adapter coupled with the system bus; and
   a computer readable storage medium having computer usable program code embodied therewith, the computer usable program code comprising a computer usable program code configured to:
   identify a questionable language usage;
   create a query in dependence upon the questionable language usage including identifying suggested language usage in dependence upon the questionable language usage and substituting at least one word of the questionable language usage with at least one word of the suggested language usage;
   query a search engine with the query;
   receive from the search engine search result statistics describing search results for the query; and
   determine, in dependence upon search results statistics returned by the search engine, whether the questionable language usage is proper language usage.

6. The apparatus of claim 5, wherein the computer usable program code configured to create a query in dependence upon the questionable language usage comprises the computer usable program code configured to use the identified questionable language usage as a query.

7. The apparatus of claim 5, wherein the computer usable program code configured to determine, in dependence upon search result statistics returned by the search engine, whether the questionable language usage is proper language usage comprises the computer usable program code configured to:
   receive a plurality of search result statistics for a plurality of queries created in dependence upon the questionable language usage; and
   identify one of the plurality of queries as the proper language usage in dependence upon the search result statistics and statistics evaluation rules.

8. The apparatus of claim 7, wherein the computer usable program code is further configured to:
   determine whether the proper language usage is the same as the questionable language usage; and
   suggest the proper language usage to a user when the proper language usage is not the same as the questionable language usage.

* * * * *